(12) United States Patent
Walgren et al.

(10) Patent No.: US 8,992,193 B2
(45) Date of Patent: Mar. 31, 2015

(54) SHAFT ASSEMBLY INCLUDING A CONTAINED SHAFT SPRING LOAD

(75) Inventors: Timothy P. Walgren, Byron, IL (US); Steven A. Heitz, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 529 days.

(21) Appl. No.: 13/183,619

(22) Filed: Jul. 15, 2011

(65) Prior Publication Data

US 2013/0017113 A1 Jan. 17, 2013

(51) Int. Cl.
*F03C 2/00* (2006.01)
*F04C 27/02* (2006.01)
*F04C 29/02* (2006.01)
*F04C 29/04* (2006.01)
*F02C 7/32* (2006.01)
*F02C 7/22* (2006.01)
*F02C 7/36* (2006.01)

(52) U.S. Cl.
CPC ... *F02C 7/32* (2013.01); *F02C 7/22* (2013.01); *F02C 7/36* (2013.01)
USPC ............ 418/102; 418/1; 418/132; 418/206.1; 418/206.8; 464/169; 403/359.4

(58) Field of Classification Search
USPC .......... 418/191, 61.3, 206.1–206.8, 102, 133, 418/1, 132; 464/169; 403/359.4
See application file for complete search history.

(56) References Cited

U.S. PATENT DOCUMENTS

| 1,626,557 | A | * | 4/1927 | Rolaff | 418/133 |
| 2,102,344 | A | * | 12/1937 | Wishart | 418/138 |
| 2,567,127 | A | * | 9/1951 | Shoffner | 464/169 |
| 2,699,925 | A | * | 1/1955 | Madl | 416/122 |
| 2,995,955 | A | * | 8/1961 | Kelley | 475/40 |
| 3,105,441 | A | * | 10/1963 | Grill et al. | 418/69 |
| 3,182,596 | A | | 5/1965 | Prijatel | |
| 3,549,218 | A | | 12/1970 | Cagnon et al. | |
| 4,271,942 | A | * | 6/1981 | Ballendux | 192/48.91 |
| 5,004,407 | A | | 4/1991 | Hutchison | |
| 5,275,205 | A | * | 1/1994 | Bauer | 418/181 |
| 5,658,087 | A | * | 8/1997 | Butkovich et al. | 403/359.5 |
| 6,042,352 | A | | 3/2000 | Halter et al. | |
| 6,048,101 | A | | 4/2000 | Rasmussen | |
| 6,280,340 | B1 | | 8/2001 | Masuda | |
| 6,321,527 | B1 | | 11/2001 | Dyer et al. | |
| 7,094,042 | B1 | | 8/2006 | Borgetti et al. | |
| 7,878,781 | B2 | | 2/2011 | Elder | |
| 2006/0024188 | A1 | | 2/2006 | Muscarella et al. | |
| 2009/0159370 | A1 | * | 6/2009 | Maners et al. | 464/16 |

OTHER PUBLICATIONS

U.S. Appl. No. 13/034,943, filed Feb. 25, 2011.

* cited by examiner

*Primary Examiner* — Theresa Trieu
(74) *Attorney, Agent, or Firm* — Carlson, Gaskey & Olds, P.C.

(57) ABSTRACT

An input shaft assembly is movable along an axis to absorb external impact loads. A biasing member exerts an axial load in a direction counter to potential impact loads. A stop is provided to control the application of biasing loads to control application of such axial load.

6 Claims, 14 Drawing Sheets

SHAFT ASSEMBLY INCLUDING A CONTAINED SHAFT SPRING LOAD

BACKGROUND

This disclosure generally relates to a pump. More particularly, this disclosure relates to a fuel pump for a gas turbine engine.

Fuel pumps provide fuel flow and pressure for gas turbine engines and other systems aboard an aircraft. The fuel pump is required to perform over a varied and wide operating range while maintaining a minimum flow and pressure. Fuel pumps are typically powered through an accessory gearbox and input drive shaft. The drive shaft is commonly provided on the fuel pump and in some instances is exposed to impact loads. It is required that the fuel pump meet all performance requirements throughout the operational life regardless of possible applied impact loads.

SUMMARY

An example disclosed gear pump is driven by an accessory gearbox to communicate a fluid such as fuel to a gas turbine. Rotational power is transferred from the gas turbine to the accessory gearbox then to the gear pump through an input shaft assembly.

The input shaft assembly includes an input shaft received within a bore, a spring plate and a spring. The spring plate is constrained within an annular cavity at the end of the bore. The spring exerts a biasing force through the spring plate on the input shaft. The input shaft may receive an impact load and therefore is configured to move along the axis A. The spring plate controls application of biasing forces on the input shaft. In one example, the spring plate is constrained within an annular cavity to limit axial distance over which a biasing force is exerted on the input shaft.

In another example, the input shaft includes an integral stop defined as part of the splines. The integral stop is defined as part of the splines by eliminating a gap between adjacent teeth to define a single enlarged tooth as the stop. The splines of the input shaft including the stop are inserted entirely through two sets of splines. The first set includes an opening for the stop, and the second includes a larger opening for the stop. Once the input shaft is inserted past the first and second sets of splines, it is rotated a single increment and allowed back into mating contact with the splines. Rotation of the input shaft misaligns the stop with the first opening such that the input shaft is prevented from moving axially completely back through both of the two sets of splines. The spring biases the input shaft until the stop engages the misaligned set of splines. The contact with the stop and the first set of splines prevents biasing forces from being exerted on the input shaft beyond a fixed and desired axial distance.

The control of axial thrust loads on the input shaft provide for use with an accessory gearbox or other drive device not compatible with a continuous thrust load.

These and other features disclosed herein can be best understood from the following specification and drawings, the following of which is a brief description.

DETAILED DESCRIPTION

Figure 1:
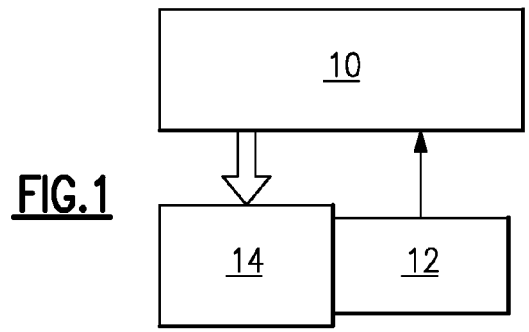
FIG. 1 is a block diagram of a gear pump driven by an accessory gearbox to communicate fuel to a gas turbine engine.

FIG. 1 schematically illustrates a gear pump 12 driven by an accessory gearbox 14 to communicate a fluid such as fuel to a gas turbine 10. It should be appreciated that the present application is not limited to use in conjunction with a specific system. Accordingly, it should be appreciated that it can be implemented in numerous other systems. In addition, although a gear pump is disclosed, other machines with a shaft will also benefit from this disclosure.

Figure 2:
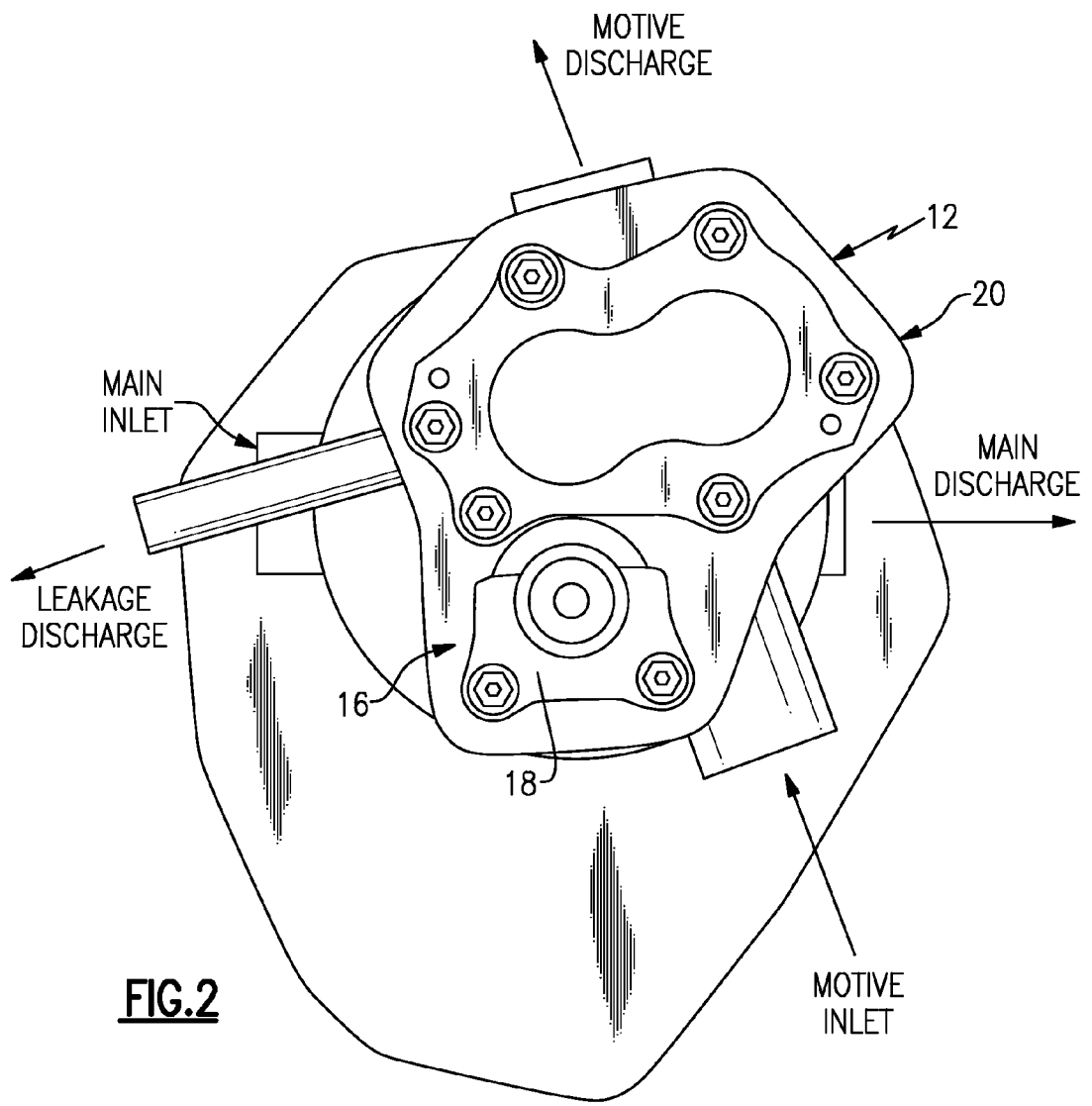
FIG. 2 is an end view of an example gear pump.
Figure 3:
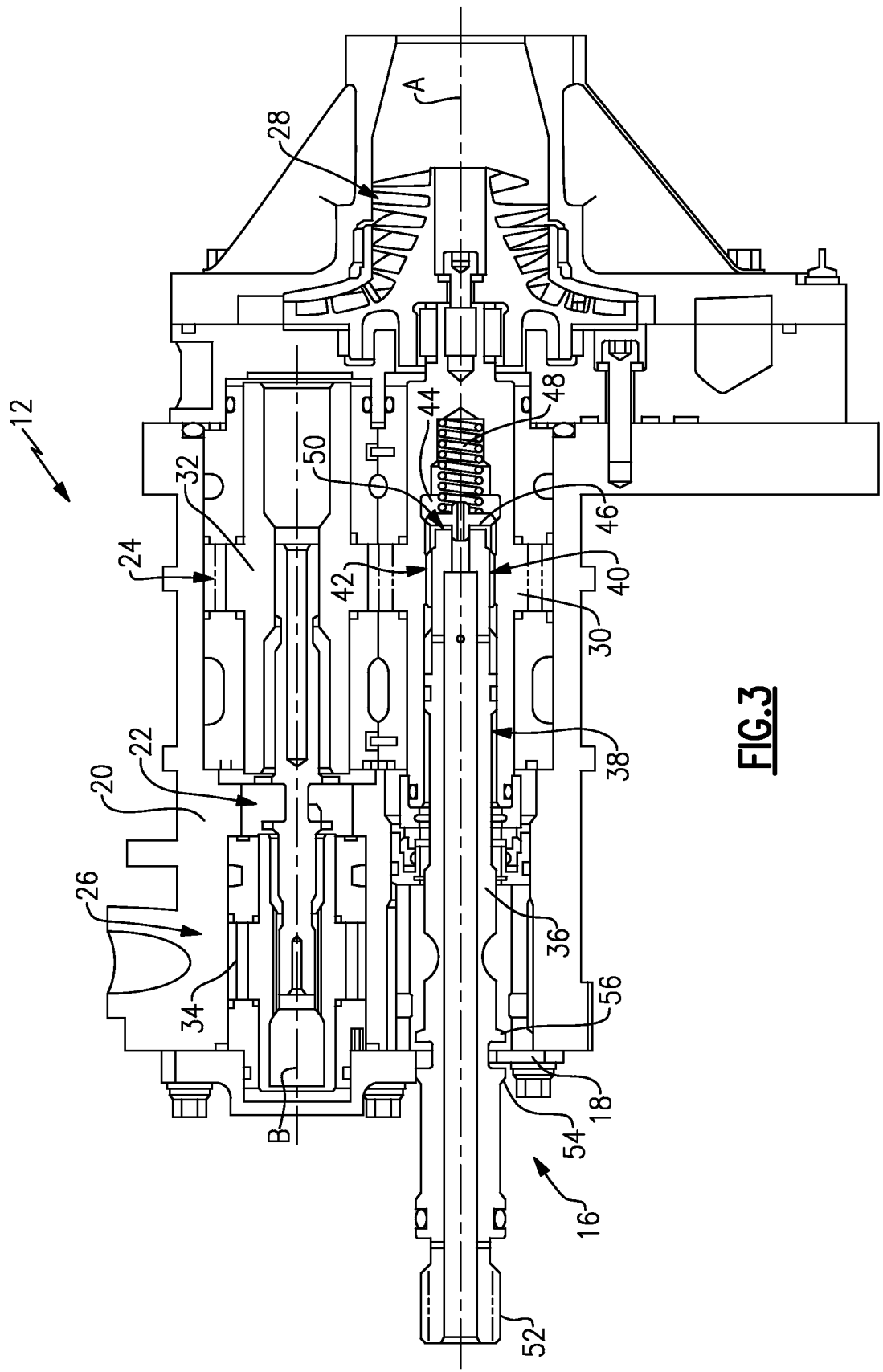
FIG. 3 is a cross-sectional view of the example gear pump.

Referring to FIGS. 2 and 3, the gear pump 12 generally includes a housing 20 that includes an input shaft assembly 16 and a coupling shaft assembly 22 to power a main stage 24 and a motive stage 26. Rotational power is transferred from the gas turbine 10 to the accessory gearbox 14 then to the gear pump 12 through the input shaft assembly 16. The example input shaft assembly 16 interfaces and receives lubricant with the accessory gearbox 14 while the coupling shaft assembly 22 is lubricated with fuel.

The input shaft assembly 16 is defined along an input axis A and the coupling shaft assembly 22 is defined along a coupling axis B parallel to the input axis A. The main stage 24 includes a main drive gear 30, and a main driven gear 32. The motive stage 26 includes a motive drive gear 34, and a motive driven gear (not shown). The main drive gear 30 is in meshed engagement with the main driven gear 32 and the motive drive gear 34 is in meshed engagement with the motive driven gear. The input shaft assembly 16 drives the coupling shaft assembly 22 through the main stage 24 to drive the motive stage 26.

A boost stage 28 is also driven by the input shaft assembly 16 to define a centrifugal pump with an impeller and integrated inducer.

The stages 24, 26, 28 work mostly independently. Each stage 24, 26, 28 includes a separate inlet and discharge (FIG. 2). Fluid is communicated from the main stage inlet to the main stage discharge and from a motive stage inlet to a motive stage discharge such that the main stage 24 communicates a main fuel flow while the motive stage 26 supplies a motive fuel flow. The main stage inlet and main stage discharge as well as the motive stage inlet and motive stage discharge are respectively directed along generally linear paths through the respective gear stage 24, 26.

In the disclosed embodiment, an aircraft fuel system provides flow and pressure to the boost stage 28. A portion of the boost stage discharge is routed internally to the motive stage inlet. The remainder of the boost stage discharge is discharged from the gear pump 12 to the aircraft fuel system and then returns to the main stage inlet. The motive stage discharge is communicated to the aircraft fuel system. The main stage discharge is also communicated to the aircraft fuel system to provide actuation and engine burn flow.

Figure 4:
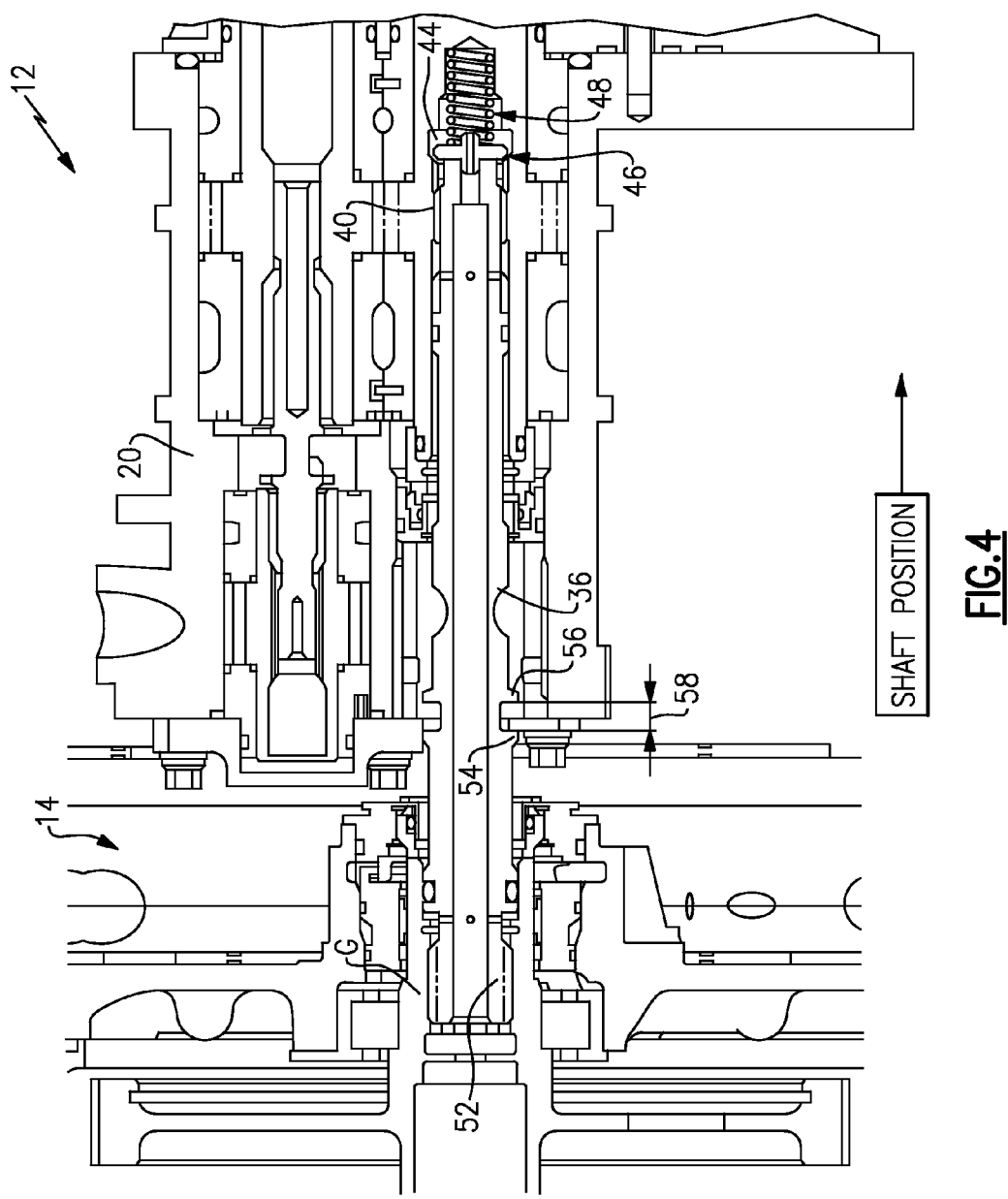
FIG. 4 is a sectional view of the example gear pump and accessory gearbox with an input shaft in a rearward position.

Referring to FIG. 3, the input shaft assembly 16 includes an input shaft 36 received within a splined bore 38, a spring plate 46 and a spring 48. The example input shaft 36 is hollow and includes splines 40 that mate with the splined bore 38 within the main drive gear 30. The input shaft 36 also includes splines 52 that mate with a gear G of the accessory gearbox 14 (FIG. 4). An opposite end 50 of the input shaft 36 engages the spring plate 46. The spring plate 46 is constrained within an annular cavity 44 at the end of the splined bore 38. The spring 48, also referred to as a biasing member, exerts a biasing force through the spring plate 46 on the input shaft 36.

A retainer plate 18 is mounted to the housing 20 within an axial distance 58 (FIG. 4) defined between a first shoulder 54 and a second shoulder 56 disposed of the input shaft 36. The first shoulder 54 and the second shoulder 56 prevent the input shaft 36 from dislodging from within the splined bore 38 and constrain axial movement of the input shaft 36.

Referring to FIG. 4, the example gear pump 12 is shown engaged to an accessory gearbox 14. In this orientation, the input shaft 36 is engaged to a mating gear G within the accessory gearbox 14. The accessory gearbox 14 drives the input shaft 36 through the splines connection with the mating gear G within the accessory gearbox 14.

During assembly of the gear pump 12 onto the accessory gearbox 14, the input shaft 36 may receive an impact load. Accordingly, the input shaft 36 is configured to move axially along the axis A. This movement along the axis A provides for the absorption of impact that may occur during handling and assembly. In FIG. 4, the input shaft 36 is shown in a position where the first shoulder 54 is in direct contact with the retainer plate 18. In this position the input shaft is pushed inwardly into the gear pump 12 a maximum distance.

The orientation illustrated in FIG. 4 is not desirable for operation and therefore the spring 48 is provided to bias the input shaft 36 in a direction such that the first shoulder 54 does not remain in contact with the retainer plate 18. However, the accessory gearbox 14 is not configured to absorb a constant thrust load along the axis A. Accordingly, the input shaft assembly 16 includes a stop to control application of biasing forces on the input shaft 36. In this non-limiting example, the biasing force exerted by the spring 48 is limited by the spring plate 46. The spring plate 46 is constrained within an annular cavity 44. The spring plate 46 can move within the limited axial distance defined by the annular cavity 44 and therefore controls the distance over which a biasing force is exerted on the input shaft 36.

Figure 5:
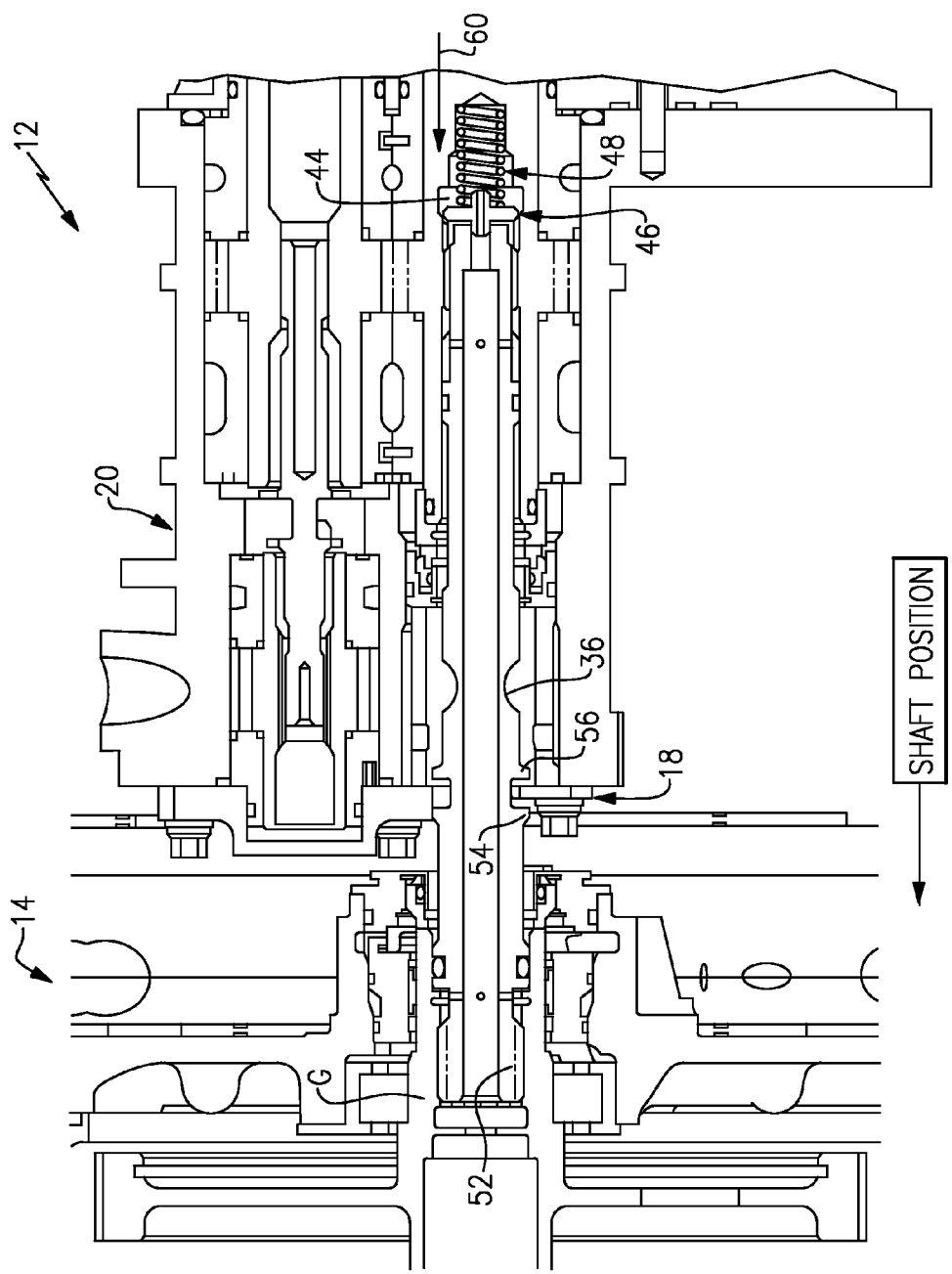
FIG. 5 is another sectional view of the example gear pump and accessory gearbox with the input shaft in a forward position.

Referring to FIG. 5, the input shaft 36 is illustrated in an operational position where the splined end 52 is engaged to the gear G of the accessory gearbox 14. The spring 48 has pushed the spring plate 46 against one side of the annular cavity 44. In this position, the spring 48 has exerted a biasing force in the direction of arrows 60 that causes the spring plate 46 to seat against one side of the annular cavity 44. This contact stops the spring 48 from exerting a constant thrust load on the input shaft 36 and thereby the accompanying interface within the gear G within the accessory gearbox 14. A gap that is created between the input shaft 36 and spring plate 46 prevents the constant load on the input shaft 36 and thereby prevents the control load on gear G.

The limited axial movement of the spring plate 46 permits the biasing force from the spring 48 to act on the input shaft 36 over a limited axial distance. Moreover, the axial limit set by the spring plate 46 moves the input shaft 36 to a position where the first shoulder 54 and the second shoulder 56 are in a desired operational position relative to the retainer plate 18. The desired operational position is illustrated here in FIG. 5 with the first shoulder 54 and the second shoulder 56, spaced away from and not in contact with the retainer plate 18.

Figure 6C:
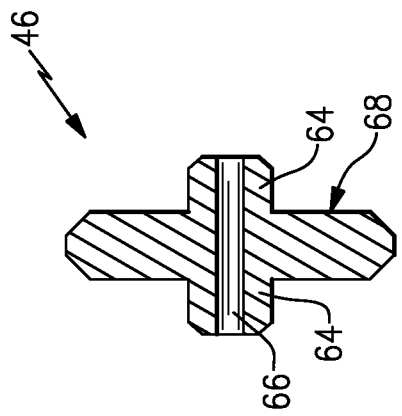
FIG. 6C is a sectional view of the example spring plate.
Figure 6B:
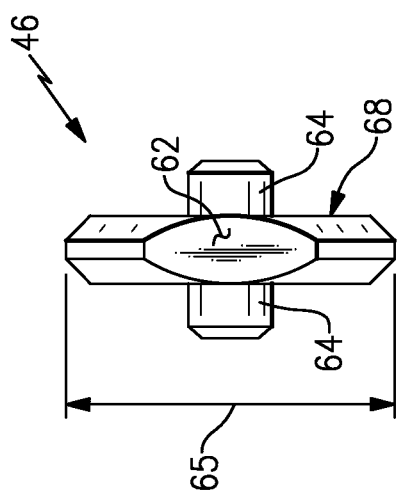
FIG. 6B is a side view of the example spring plate.
Figure 6A:
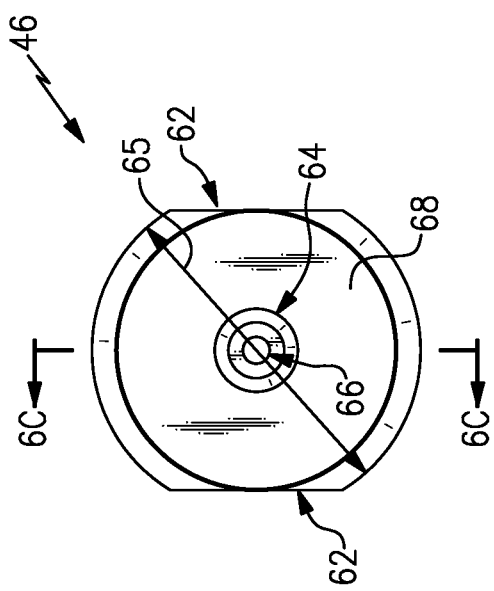
FIG. 6A is a front view of an example spring plate.

Referring to FIGS. 6A, 6B and 6C, the example spring plate 46 is generally a circular disk 68 with opposing and parallel flat sides 62. The flat sides 62 aid in assembly of the spring plate 46 within the splined bore 38 for the input shaft 36. The example spring plate 46 further includes a guide portion 64 that extends outwardly for engagement with an opening in the input shaft 36 and for engagement with the inner diameter of the spring 48. The guide portion 64 provides a desired alignment between the spring plate 46 and input shaft 36 and between the spring plate 46 and spring 48. The circular disk 68 provides a surface on which the spring 48 seats. The guide portion 64 and the spring plate 46 include an opening 66. This opening 66 provides for an open orientation that corresponds with the open hollow input shaft 36. The spring plate 46 is generally symmetric in order to be assembly mistake proof.

Figure 7:
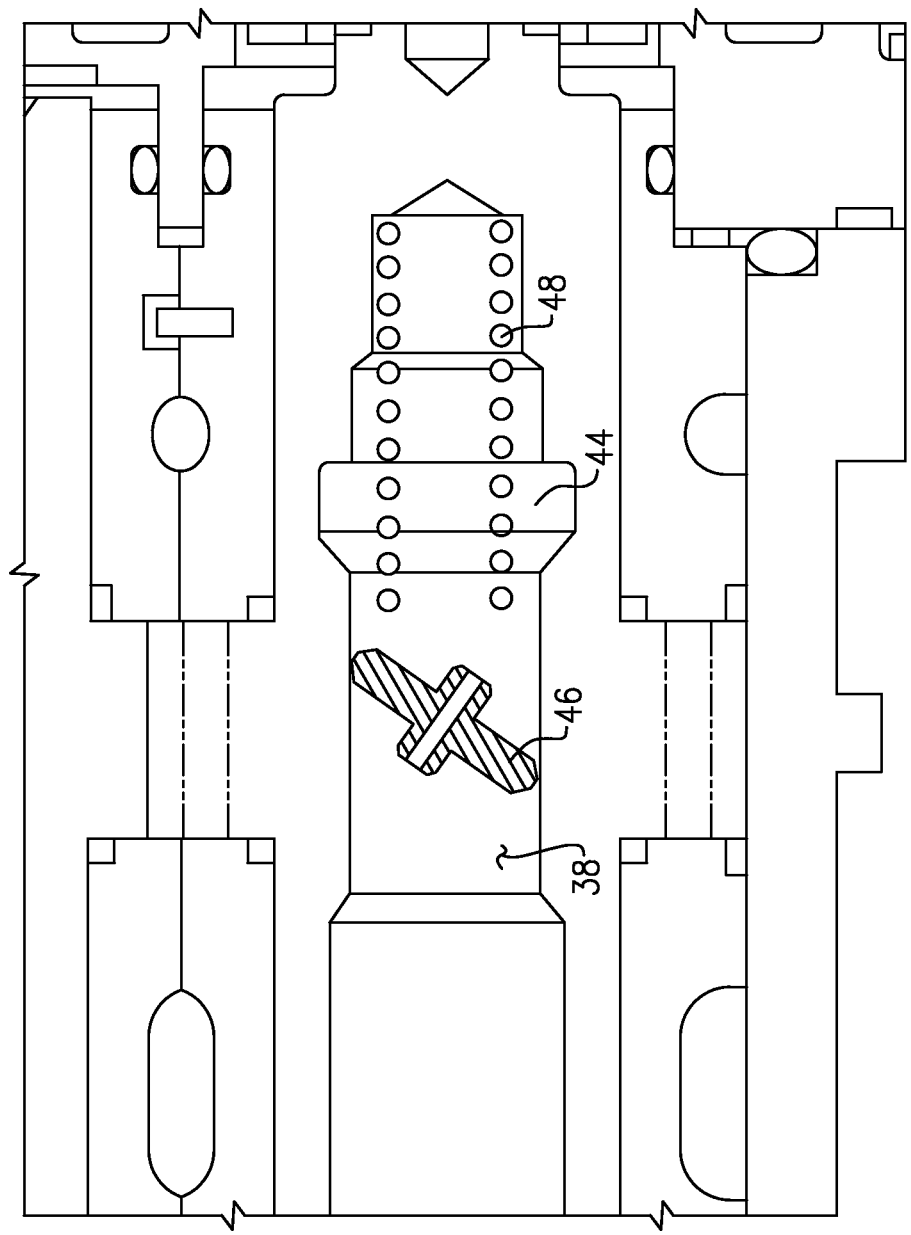
FIG. 7 is an enlarged sectional view of assembly of the example spring plate within the input shaft bore during assembly.

Referring to FIG. 7, a method of assembling the input shaft assembly 16 includes inserting the spring plate 46 into the annular cavity 44 through the splined bore 38. FIG. 7 illustrates initial insertion of the spring plate 46 into the splined bore 38. The spring plate 46 is provided at an angle relative to the axis A of the splined bore 38 as the outer diameter 65 of the spring plate 46 is greater than the splined bore 38. Accordingly, the tilted orientation shown in FIG. 7 in concert with the flat sides 62 provide for insertion of the spring plate 46 through the splined bore 38, even with the smaller diameter. The annular cavity 44 is of a diameter larger than the splined bore 38 to receive the spring plate 46.

Figure 8:
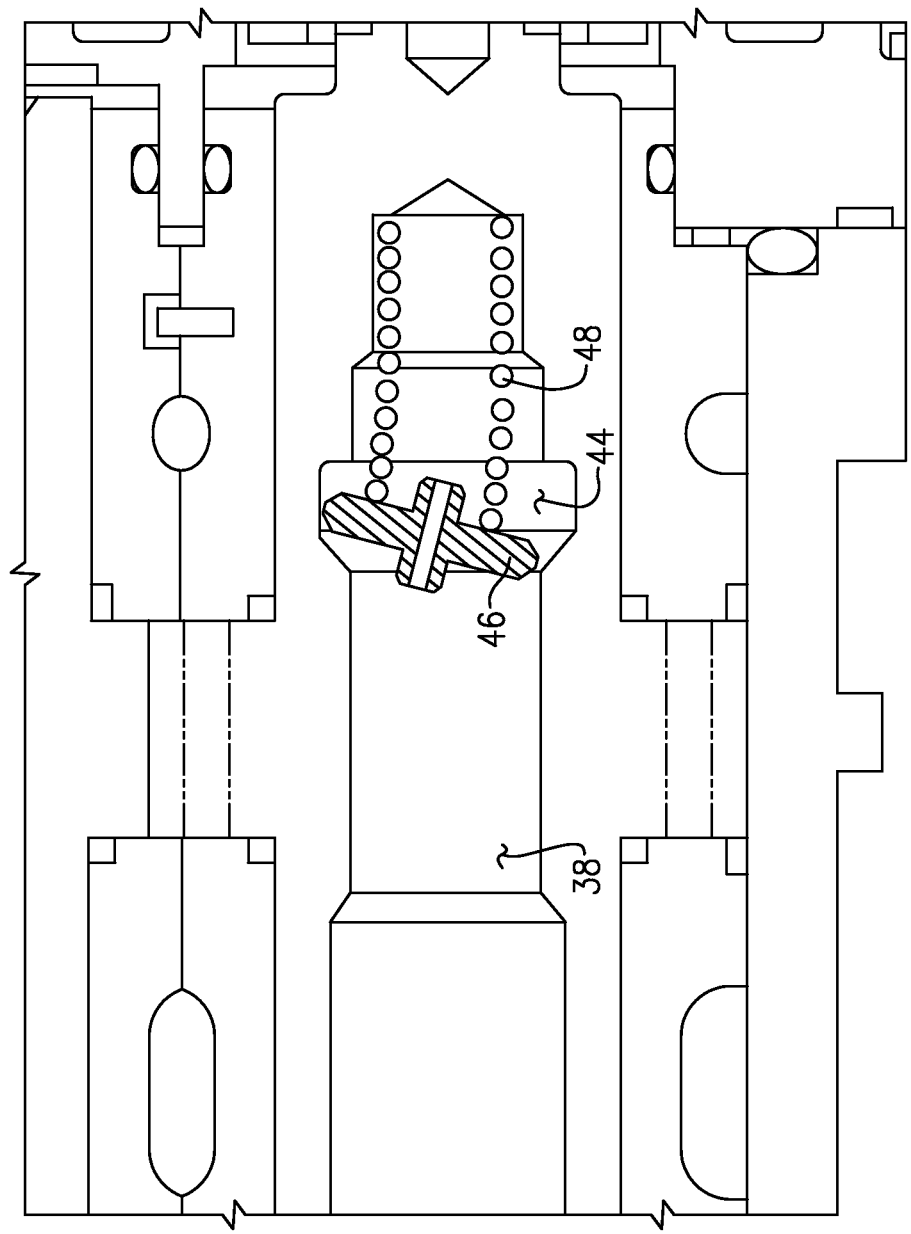
FIG. 8 is an enlarged sectional view of assembly of the example spring plate within the input shaft bore during assembly.

Referring to FIG. 8, the spring plate 46 is shown initially entering the annular cavity 44 in a less extreme tilted orientation. As the spring plate 46 enters the annular cavity 44 it is progressively turned to obtain a perpendicular orientation relative to the axis A. In the position illustrated in FIG. 8, the spring plate 46 also is initially compressing the spring 48 as it enters the annular cavity 44. At least one side of the spring plate 46 is inserted into the annular cavity 44 as the spring 48 is compressed. Once the spring 48 is compressed, the opposing side of the spring plate 46 is received within the annular cavity 44 and placed in the desired orientation that contains the spring 48 within a defined axial distance. (See FIGS. 4 and 5).

An initial application of force on the input shaft 36 as shown in FIG. 4 will initially move the spring plate 46 from the seated position against the wall of the annular cavity 44. The spring 48 will bias the input shaft 36 in the direction indicated at 60 in FIG. 5. The application of force is stopped once the spring plate 46 seats against the side of the annular cavity 44. In this manner, the accessory gearbox gear G, along with other components will not encounter thrust forces transferred through the input shaft 36.

Figure 9:
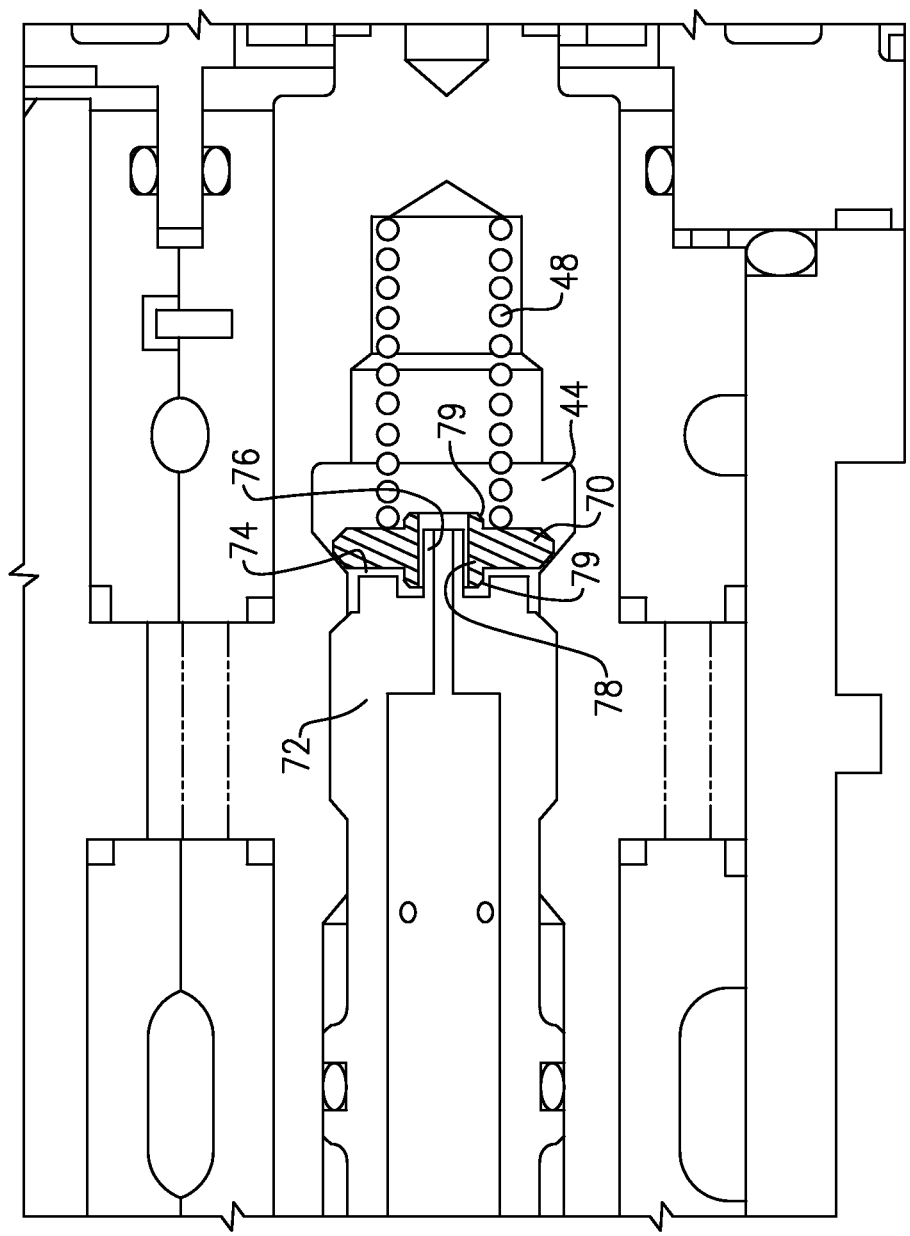
FIG. 9 is a sectional view of another example spring plate and input shaft.

Referring to FIG. 9, another input shaft 72 includes a mating end 74 that engages an example spring plate 70 with a large internal opening 78. The internal opening 78 receives a guide 76 defined on the mating end 74. The guide 76 fits within the spring plate 70 to provide a guiding function that maintains a desired relative alignment between the spring plate 70 and the input shaft 72. The spring plate 70 further includes a spring guide 79 that extends outwardly for engagement with the inner diameter of the spring 48. The spring guide 79 provides a desired alignment between the spring plate 70 and spring 48. The spring plate 70 is generally symmetric in order to be assembly mistake proof.

The disclosed example spring plates 46, 70 control biasing forces exerted on the input shaft 36, 72 to a desired axial length. The annular cavity 44 limits the axial movement of the spring plate 46, 70 and thereby limits the biasing force exerted by the spring 48 on the input shaft 36, 72.

Figure 10:
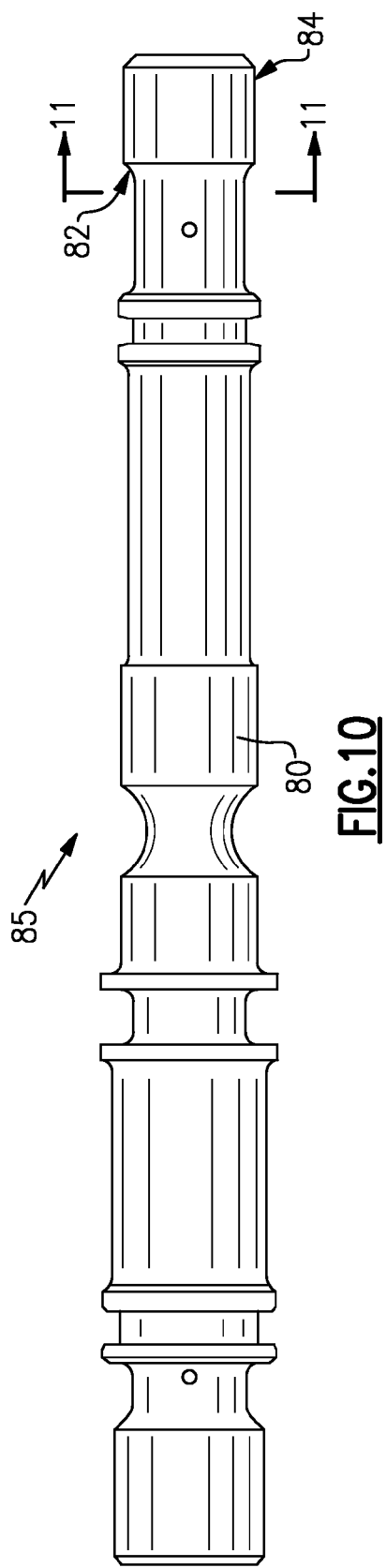
FIG. 10 is a side view of another example input shaft including a stop feature.
Figure 11:
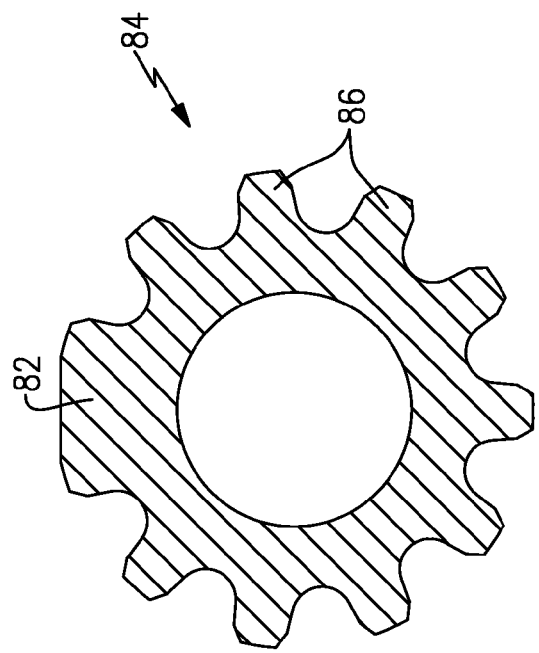
FIG. 11 is a sectional view of a splined portion of the example input shaft shown in FIG. 10.

Referring to FIGS. 10 and 11, another example input shaft assembly 85 includes the input shaft 80 with splines 84 including an integral stop 82. The integral stop 82 is defined as part of the splines 84 by eliminating a gap between adjacent teeth 86 to define a single enlarged tooth as the stop 82. As appreciated, the teeth 86 are defined as extending in a uniform radial distance and a uniform circumferential distance. However, the stop 82 includes a tooth or missing tooth configuration larger than the other teeth 86.

Figure 12:
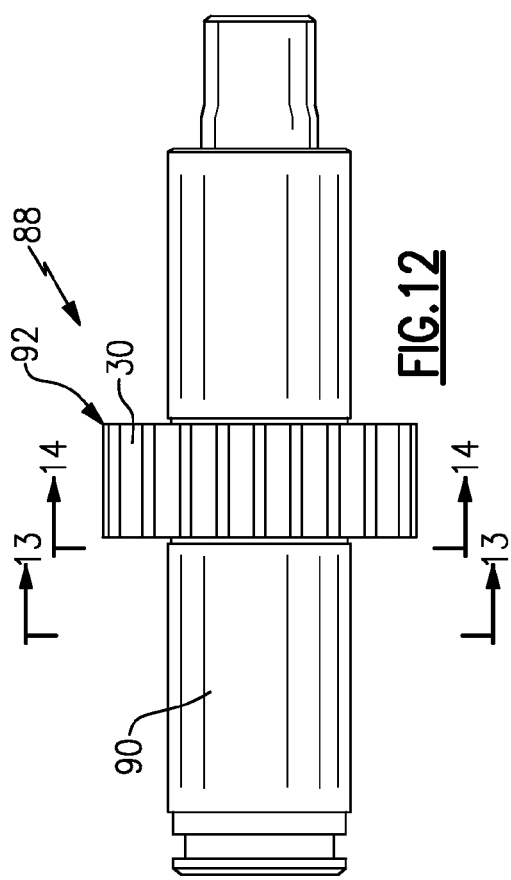
FIG. 12 is a side view of a portion of the main drive gear.
Figure 14:
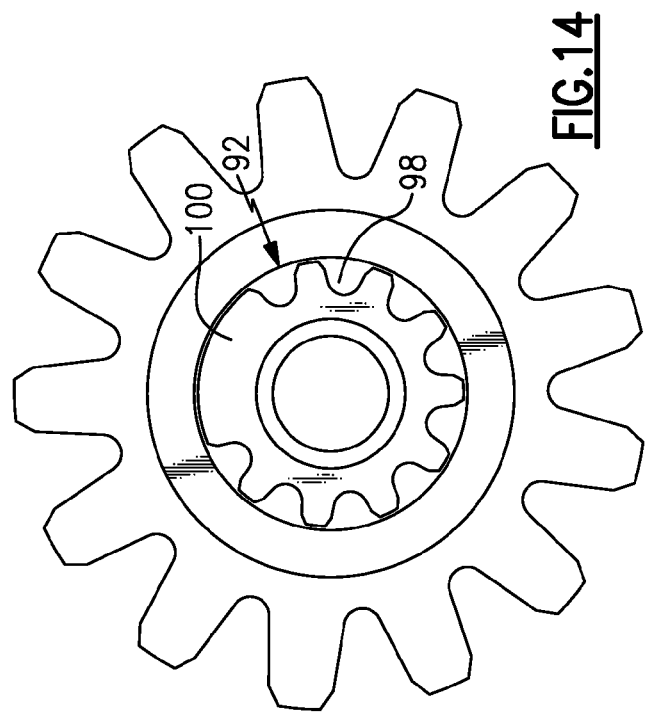
FIG. 14 is a sectional view through another portion of the main drive gear.
Figure 13:
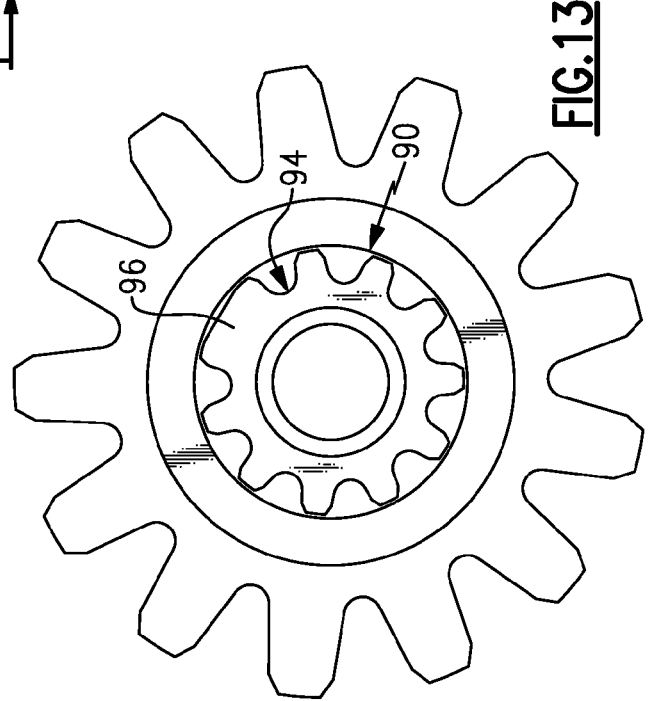
FIG. 13 is a sectional view through a portion of the main drive gear.

Referring to FIGS. 12, 13 and 14, the input shaft 80 is inserted into a main gear 88. The main gear 88 includes a first bore section 90 axially forward of a second bore section 92. Both the first and second bore sections 90, 92 include splines that correspond with those on the input shaft 80. The example main gear 88 includes the main drive gear 30 such that the input shaft 80 drivingly engages the main drive gear 30. The first bore section 90 includes splines 94 and an opening 96 for the stop 82. The opening 96 is sized to fit the stop 82 without additional space. That is, the opening 96 is sized such that the stop 82 can fit there through. However, the opening 96 is sized with only the minimum required opening size to receive the stop 82.

The second bore section 92 includes splines 98 that correspond to the splines 84 of the input shaft 80 and substantially match the splines 94 in the first bore section 90. The second bore section 92 also includes an opening 100 that is larger than the stop 82 and aligned with the opening 96 of the first bore section 90. Accordingly, the input shaft 80, and more specifically, the splines 84 and the stop 82 are received within the main gear 88. Moreover, the splines 84 are inserted entirely through both the first and second bore sections 90 and 92 until completely clear of mating contact. The input shaft 80 is then rotated a single increment and allowed back into mating contact with the splines 98. However, as the stop 82 is not misaligned with the opening 96, the input shaft 80 is prevented from moving axially completely through the main gear 88.

Figure 16:
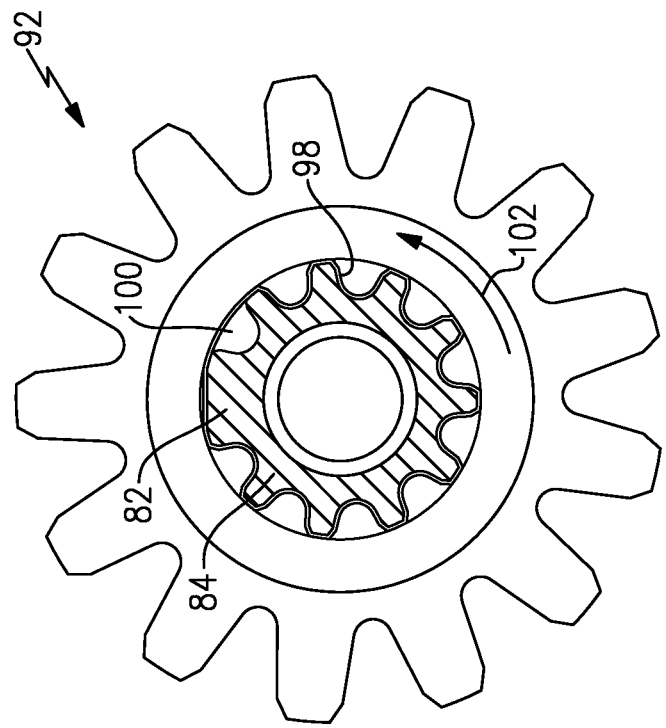
FIG. 16 is a schematic view of the input shaft received within the portion of the main drive gear shown in FIG. 14.
Figure 15:
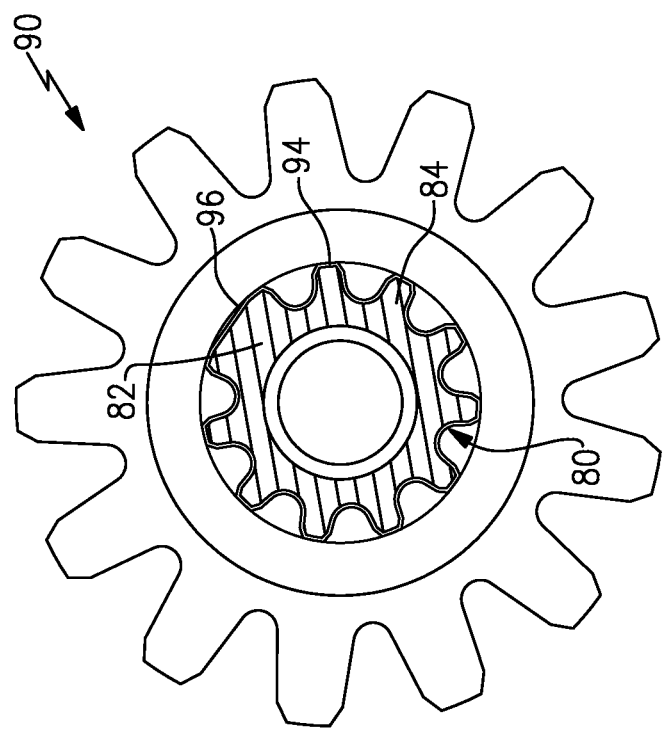
FIG. 15 is a schematic view of the input shaft being received within the portion of the main drive gear shown in FIG. 13.

Referring to FIGS. 15 and 16, the input shaft 80 is shown within the first bore section 90. Within the first bore section 90, the input shaft 80 and the stop 82 are aligned to fit through the opening 96. Once the entire portion of splines 84 of the input shaft 80 is clear of the main gear 88 and the splines 94 and 98 in both the first and second bore sections 90, 92, the input shaft 80 is rotated in a direction indicated by arrow 102 such that the stop 82 is misaligned with the opening 96.

With the stop 82 misaligned with the opening 96, the splines 84 are prevented from moving back into the first bore section 90 and remains engaged to the splines 98 within the second section bore section 92 as is shown in FIG. 16. The engagement between splines 98 and those of the input shaft 84 provide for the transfer of rotational power while preventing axial movement of the input shaft 80 outside of a defined axial distance in a direction outward from the gear pump 12.

Figure 17:
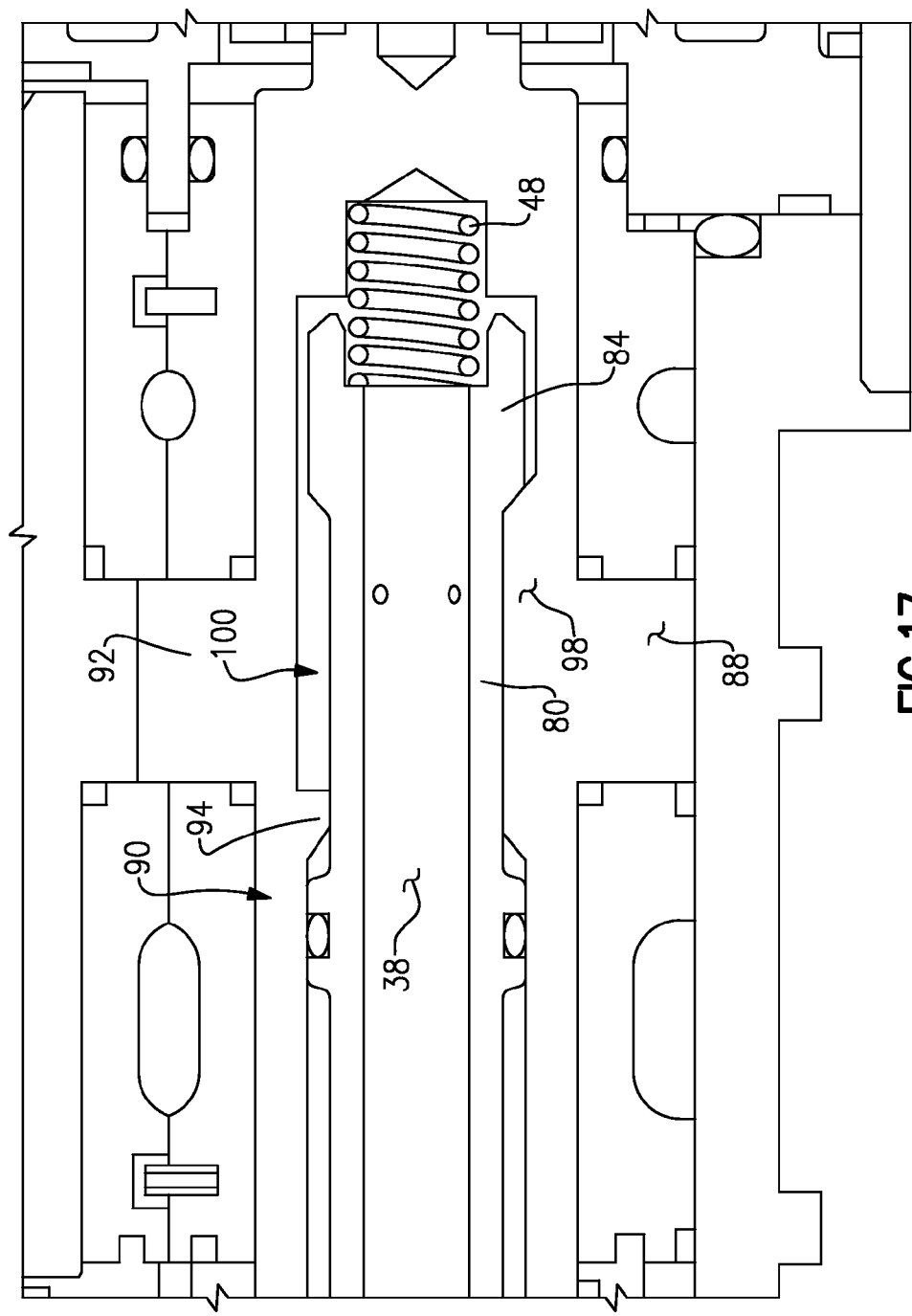
FIG. 17 is a sectional view of the input shaft inserted past the splined portion of the main drive gear.

Referring to FIG. 17, the installation steps required to install the input shaft 80 include the initial insertion of the input shaft 80 through the main gear 88 and the first and second bore sections 90, 92. The spring 48 is first placed at the end of the splined bore 38. The input shaft 80 is pushed against the spring 48 until the splines 84 are clear of both first and second bore sections 90 and 92. That is, the portion of the splines 84 is aligned with the opening 96 and inserted through the first bore section 90. The stop 82 is further pushed through the opening 100 defined in the second bore section 92. Once the splines 84 of the input shaft 80 clear the splines of the second bore section 92, it is rotated one increment such that the stop 82 is misaligned with the opening 96 in the first bore section 90.

Figure 18:
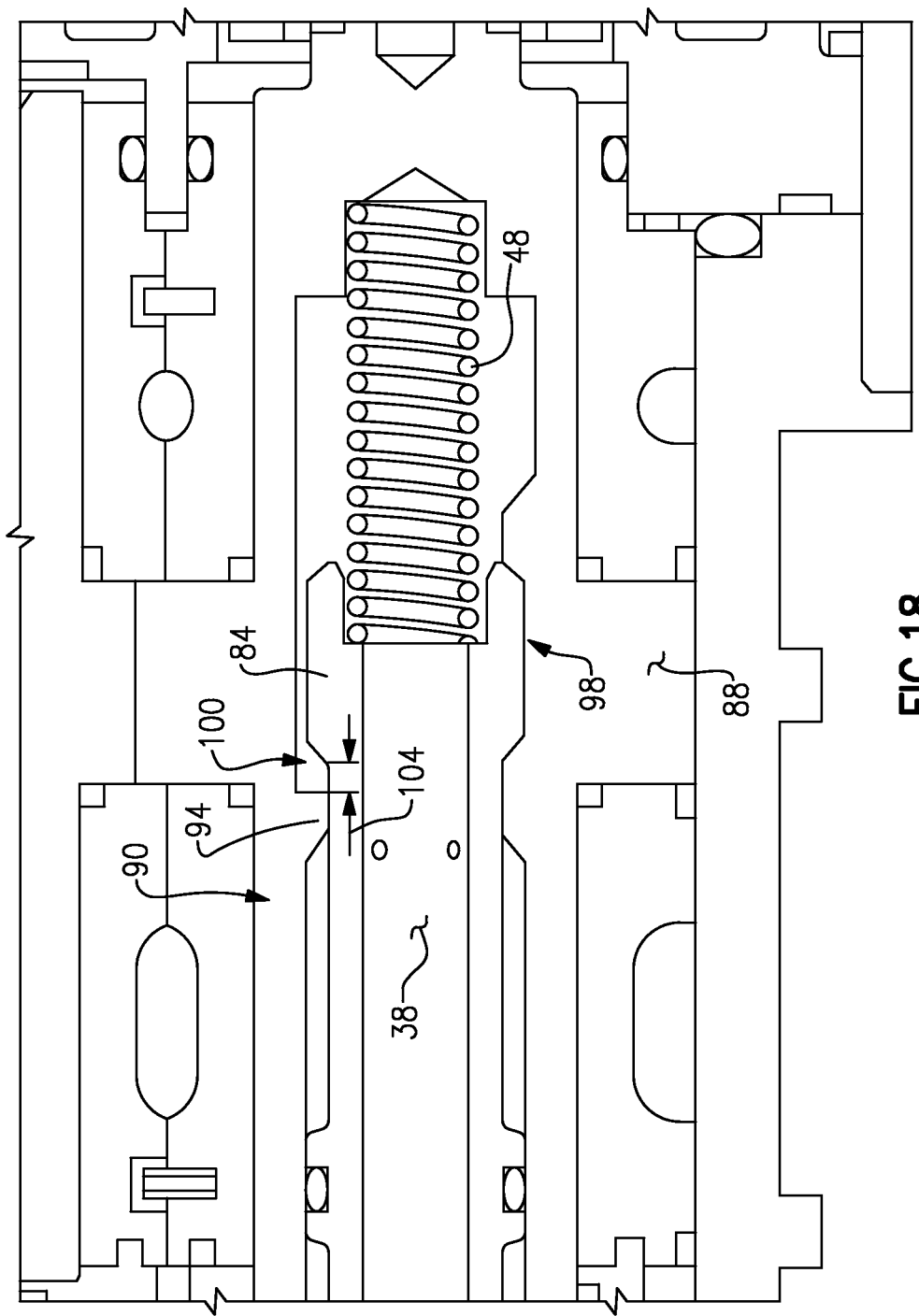
FIG. 18 is a sectional view of the input shaft received within the splined portion of the main drive gear.

Referring to FIG. 18, the input shaft 80 is then released and biased outwardly along the axis A by the spring 48. With the input spines 84 incremented by one tooth, the stop 82 is no longer aligned with the opening 96, but is received within the larger opening 100 within the second bore section 92. In a position of the input shaft 80 receiving an impact load as shown in FIG. 18, the stop portion 82 is spaced a distance 104 from the first bore section 90.

Figure 19:
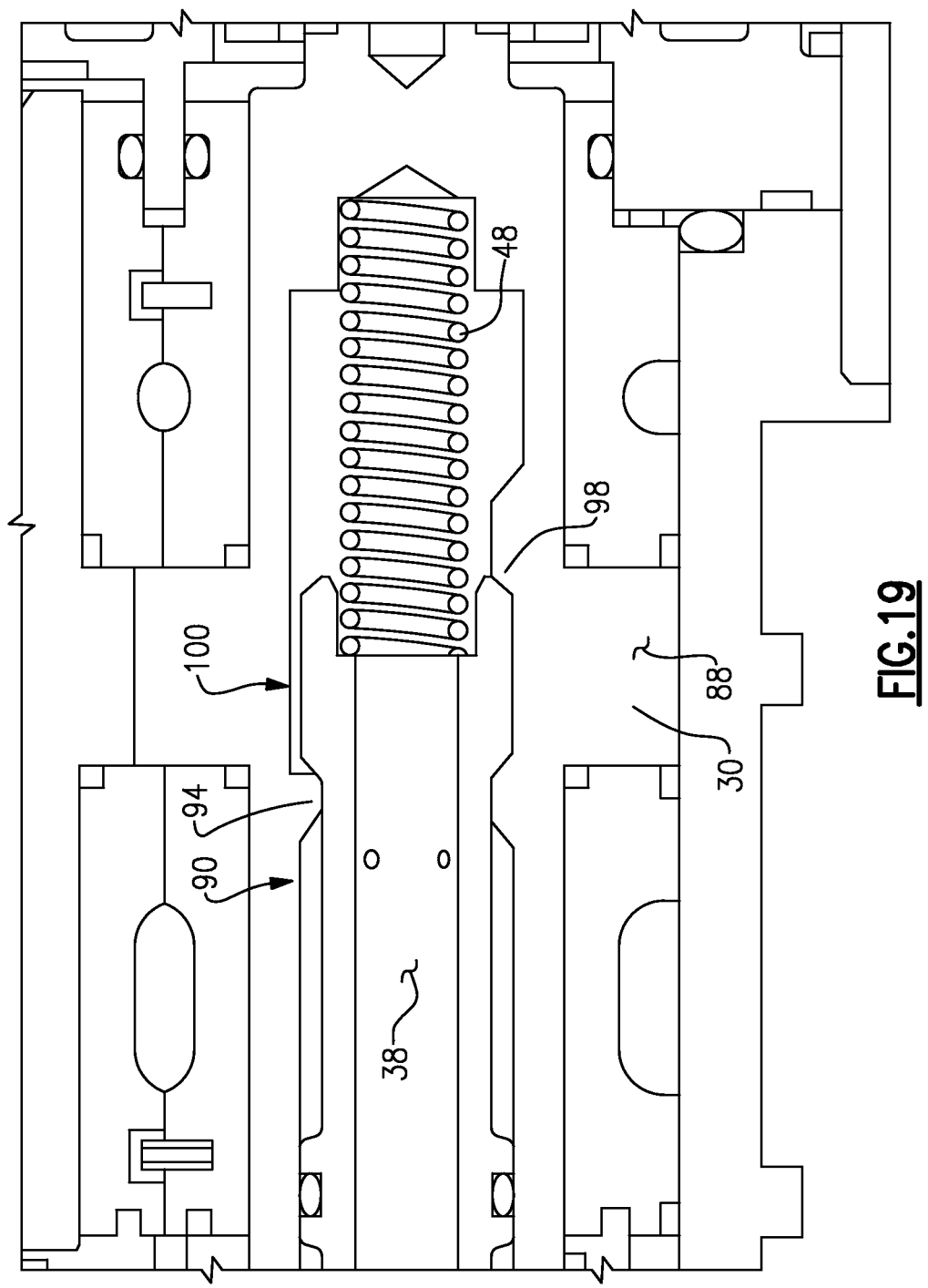
FIG. 19 is a sectional view of the input shaft engaged to a stop portion of the splines of the main drive gear.

Referring to FIG. 19, the spring 48 will bias the input shaft 80 until the stop 82 engages the splines 94 of the first bore section 90 due to the misalignment between the opening 96 and the stop 82. The contact with the stop 82 and the first bore section 90 prevents biasing forces from being exerted on the input shaft 80 beyond a fixed defined axial distance.

The integral stop 82 on the input shaft 80 limits the axial distance in which a biasing force can be exerted. Therefore, thrust loads are not exerted on any portion of the accessory gearbox 14 during operation while the input shaft 80 is still able to absorb impact loads. This limiting of the axial thrust loads allows the example input shaft assemblies 16, 85 to be utilized in accessory gearbox assemblies that are not compatible and are not configured to accept a continuous thrust loads.

Although example embodiments have been disclosed, a worker of ordinary skill in this art would recognize that certain modifications would come within the scope of this disclosure. For that reason, the following claims should be studied to determine the scope and content of this invention.

What is claimed is:

1. A gear pump assembly comprising:
   a gear pump housing;
   an input shaft received within a bore defined within the gear pump housing;
   a biasing member disposed within the bore biasing the input shaft in an axial direction;
   a stop disposed within the bore constraining axial movement of the shaft responsive to a biasing force exerted by the biasing member; and
   a spring plate disposed between the biasing member and an end of the shaft, the spring plate movable within a cavity within the bore proximate the end of the shaft and limiting an axial distance along which the biasing member exerts a biasing force on the input shaft.

2. The gear pump assembly as recited in claim 1, wherein the cavity comprises an annular cavity having a diameter larger than the bore and an axial position limiting axial movement of the shaft responsive to the biasing force exerted by the biasing member.

3. The gear pump assembly as recited in claim 1, wherein the spring plate includes a guide corresponding with the end of the shaft for maintaining a desired alignment between the spring plate and the end of the shaft.

4. The gear pump assembly as recited in claim 1, including a retainer plate secured to the housing and the input shaft includes a first shoulder and a second shoulder spaced an axial distance apart from each other, wherein the retainer plate extends at least partially within the axial distance between the first shoulder and the second shoulder for limiting axial movement of the shaft to the axial distance between the first shoulder and the second shoulder.

5. A method of installing an input shaft into a machine comprising:
  positioning an input shaft within a bore of the machine to extend at least partially form the machine;
  providing a stop within the bore for limited axial movement of the input shaft along an axis of rotation within the bore in a direction out of the bore;
  biasing the input shaft along the axis in the direction out of the bore;
  controlling the bias on the input shaft to a defined axial distance that is less than an axial length of the bore; and
  assembling a spring stop into an annular cavity larger than the bore between a spring and an end of the input shaft and limiting axial movement of the spring stop to an axial length of the annular cavity for limiting application of a biasing force on the input shaft to the axial length corresponding with the cavity.

6. A method of installing an input shaft into a machine comprising:
  positioning an input shaft within a bore of the machine to extend at least partially form the machine;
  providing a stop within the bore for limited axial movement of the input shaft along an axis of rotation within the bore in a direction out of the bore;
  biasing the input shaft along the axis in the direction out of the bore;
  controlling the bias on the input shaft to a defined axial distance; and inserting a splined end of the input shaft through a splined bore having an opening for receiving a stop defined on the end of the input shaft such that the splined end of the shaft clears the splined bore, rotating the input shaft to misalign the stop and opening and moving the splined end of the input shaft back into mating contact with the splined bore.

* * * * *

UNITED STATES PATENT AND TRADEMARK OFFICE
CERTIFICATE OF CORRECTION

Page 1 of 1

PATENT NO.         : 8,992,193 B2
APPLICATION NO.    : 13/183619
DATED              : March 31, 2015
INVENTOR(S)        : Timothy P. Walgren et al.

It is certified that error appears in the above-identified patent and that said Letters Patent is hereby corrected as shown below:

IN THE CLAIMS;

In claim 6, column 8, line 13; delete "form" and replace with --from--

Signed and Sealed this
Thirteenth Day of October, 2015

Michelle K. Lee
*Director of the United States Patent and Trademark Office*